United States Patent
Park et al.

(10) Patent No.: US 10,125,805 B2
(45) Date of Patent: Nov. 13, 2018

(54) RIVET SCREW DRILL

(71) Applicant: SUNGWOO HITECH CO., LTD., Busan (KR)

(72) Inventors: Byung Joon Park, Busan (KR); Mun Yong Lee, Busan (KR)

(73) Assignee: SUNGWOO HITECH CO., LTD, Busan (KR)

(*) Notice: Subject to any disclaimer, the term of this patent is extended or adjusted under 35 U.S.C. 154(b) by 50 days.

(21) Appl. No.: 15/131,204

(22) Filed: Apr. 18, 2016

(65) Prior Publication Data

US 2016/0312817 A1   Oct. 27, 2016

(30) Foreign Application Priority Data

Apr. 21, 2015 (KR) .................. 10-2015-0055964
Apr. 21, 2015 (KR) .................. 10-2015-0055966
Apr. 21, 2015 (KR) .................. 10-2015-0055968

(51) Int. Cl.
*F16B 25/10* (2006.01)
*F16B 25/00* (2006.01)

(52) U.S. Cl.
CPC .......... *F16B 25/0084* (2013.01); *F16B 25/10* (2013.01); *F16B 25/106* (2013.01)

(58) Field of Classification Search
CPC .. F16B 23/00; F16B 23/0007; F16B 23/0038; F16B 23/0046; F16B 25/0084; F16B 25/10; F16B 25/103; F16B 25/106
USPC ........ 411/387.1, 387.2, 387.7, 402, 407, 424
See application file for complete search history.

(56) References Cited

U.S. PATENT DOCUMENTS

| | | | | |
|---|---|---|---|---|
| 3,180,126 A | * | 4/1965 | Carlson ................. | B21H 3/027 411/394 |
| 3,195,156 A | * | 7/1965 | Phipard, Jr. ............ | B21H 3/027 411/416 |
| 3,584,667 A | * | 6/1971 | Reiland ................ | B25B 13/065 411/402 |
| 3,681,963 A | * | 8/1972 | Muenchinger ......... | B21H 3/027 411/416 |
| 3,786,713 A | * | 1/1974 | Sygnator ............. | F16B 25/0084 411/387.7 |
| 3,812,757 A | * | 5/1974 | Reiland ............... | F16B 23/0092 411/5 |
| 3,918,345 A | * | 11/1975 | Phipard, Jr. ......... | F16B 25/0021 411/416 |

(Continued)

FOREIGN PATENT DOCUMENTS

| | | |
|---|---|---|
| CN | 2771548 | 4/2006 |
| CN | 102782343 | 11/2012 |

(Continued)

*Primary Examiner* — Roberta S Delisle
(74) *Attorney, Agent, or Firm* — Lex IP Meister, PLLC

(57) ABSTRACT

A rivet screw drill for fastening at least two panels, the rivet screw drill includes a head portion mounted to a fastening tool, a fastening portion integrally formed with the head portion and of which a screw thread is formed thereto and a perforating portion integrally formed with the fastening portion and pressurizing and penetrating the panels by rotation according to operation of the fastening tool, wherein a mounting protrusion, connected to the fastening tool, is protruded from the head portion and a plurality of support ends are formed to the mounting protrusion.

16 Claims, 15 Drawing Sheets

(56) References Cited

U.S. PATENT DOCUMENTS

| | | | | |
|---|---|---|---|---|
| 4,194,430 | A * | 3/1980 | Muenchinger | B21H 3/027 411/387.4 |
| 5,378,101 | A * | 1/1995 | Olson | B25B 13/485 411/404 |
| 5,487,633 | A * | 1/1996 | Roberts | B21H 3/027 411/187 |
| 5,690,459 | A * | 11/1997 | Donovan | F16B 17/006 29/509 |
| 5,746,039 | A * | 5/1998 | Nystrom | E04C 3/04 411/387.1 |
| 6,261,040 | B1 | 7/2001 | Reynolds | |
| 6,494,656 | B1 * | 12/2002 | Boyer | B21H 3/027 411/399 |
| 7,597,518 | B1 * | 10/2009 | Curtis | F16B 33/004 411/371.1 |
| 7,682,118 | B2 * | 3/2010 | Gong | F16B 25/0047 411/387.1 |
| 8,430,618 | B2 * | 4/2013 | Baer | F16B 35/041 411/386 |
| 8,596,943 | B2 * | 12/2013 | Matthiesen | F16B 25/0021 411/386 |
| 2013/0195579 | A1 * | 8/2013 | Freis | F16B 5/02 411/387.1 |

FOREIGN PATENT DOCUMENTS

| | | |
|---|---|---|
| JP | 54-084468 | 6/1979 |
| JP | 56-065213 | 6/1981 |
| JP | 3960589 | 8/2007 |
| JP | 2008-249092 | 10/2008 |
| KR | 10-0232069 | 9/1999 |
| KR | 10-0250246 | 1/2000 |
| KR | 20-0183860 | 3/2000 |
| KR | 10-2009-0033360 | 4/2009 |
| KR | 10-2009-0034873 | 4/2009 |
| KR | 10-2010-0098192 | 9/2010 |
| KR | 10-2012-0094895 | 8/2012 |
| KR | 10-1326220 | 10/2013 |
| KR | 10-2013-0133060 | 12/2013 |
| WO | 2008-012051 | 1/2008 |

* cited by examiner

RIVET SCREW DRILL

CROSS-REFERENCE TO RELATED APPLICATION

This application claims priority to and the benefit of Korean Patent Applications No. 10-2015-0055964, 10-2015-0055966 and 10-2015-0055968 filed in the Korean Intellectual Property Office on Apr. 21, 2015, the entire contents of which are incorporated herein by reference.

BACKGROUND OF THE INVENTION (a) Field of the Invention

Various exemplary embodiments of the present invention relates a fastening element. More particularly, the present invention relates to a rivet screw drill for mechanically fastening at least two panels.

(b) Description of the Related Art

Generally, fastening elements such as a bolt and nut, a rivet and so on are used for mechanically fastening bases such as metal or nonmetal panels, sheets and so on.

In mechanical connection using a rivet, an assembling hole is formed to bases, the rivet is inserted into the assembling hole, and then the rivet is plastically deformed to connect the bases.

In addition, a blind rivet has been used for connecting bases.

In joining between dissimilar materials such as aluminum and steel, limited methods are used for joining the bases because melting temperatures are various as well as design freedom is limited.

For overcoming the drawbacks described above, a FDS (Flow Drill Screw) has been used for fastening a plurality of panels. It is also called as a friction stir (blind) rivet.

For example, the FDS is comprised of a head portion mounted to a pressurizing/rotation device, a thread portion integrally formed with the head portion and of which screw thread is formed to an external circumferential surface thereof, and a perforating portion integrally formed with the thread portion and penetrating a panel.

However, especially when high-tensile steel sheets are assembled, free holes have to be formed to the sheets previously due to limitation of piercing characteristic of the FDS.

Thus, previous processes of piercing holes increases manufacturing costs and deteriorate productivity.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rivet screw drill having advantages of enhancing piercing characteristic and joining strength without additional piercing processes.

A rivet screw drill for fastening at least two panels according to various exemplary embodiments of the present invention, the rivet screw drill may include a head portion mounted to a fastening tool, a fastening portion integrally formed with the head portion and of which a screw thread is formed thereto and a perforating portion integrally formed with the fastening portion and pressurizing and penetrating the panels by rotation according to operation of the fastening tool, wherein a mounting protrusion, connected to the fastening tool, is protruded from the head portion and a plurality of support ends are formed to the mounting protrusion.

The support ends may be formed as a pair and radially disposed.

Six support ends may be formed as a sunflower shape.

A concave space may be formed between the support ends.

Three support ends may be formed and radially disposed.

The support ends may be shaped as a triangular circle.

The perforating portion is become sharp toward an end thereof; and

The fastening portion and perforating portion may have a cross section shaped as a Reuleaux triangle.

The fastening portion may include a main screw thread shaped as a triangle formed from the head portion to a part of the fastening portion and a sub-screw thread round shaped from the main screw thread to the other portion of the perforating portion.

The perforating portion may be become sharp toward an end thereof and a round contact edge contacting the panel may be formed to the end of the perforating portion.

An edge groove may be formed to an end of the perforating portion.

The edge groove may be formed as a cone.

The fastening portion may include a main screw thread shaped as a triangle formed from the head portion to a part of the fastening portion and a sub-screw thread round shaped from the main screw thread to the other portion of the perforating portion.

The fastening portion and perforating portion may have a cross section shaped as a Reuleaux triangle.

The perforating portion may be become sharp toward an end thereof and a line contact edge may be formed to the end of the perforating portion contacting the panel.

A cutting surface may be formed to the perforating portion.

The perforating portion may be become sharp toward an end thereof and a perforating edge groove may be formed to the perforating portion.

The perforating edge groove may include a first surface and a second surface that are formed from the end of the perforating portion.

The first surface may be a curved surface formed from the end of the perforating portion toward the fastening portion and the second surface may be a flat surface formed for connecting the first surface with an outer surface of the perforating portion.

The fastening portion may include a main screw thread shaped as a triangle formed from the head portion to a part of the fastening portion and a sub-screw thread round shaped from the main screw thread to the other portion of the perforating portion.

The fastening portion and perforating portion may have a cross section shaped as a Reuleaux triangle.

A rim may be protruded from the head portion.

The rivet screw drill according to various exemplary embodiments of the present invention may enhance productivity because previous processes of piercing holes are not required.

Also, the rivet screw drill may enhance piercing characteristic and joining strength thereof.

BRIEF DESCRIPTION OF THE DRAWINGS

The drawings illustrate exemplary embodiments of the present invention and are not construed to limit any aspect of the invention.

Figure 1:
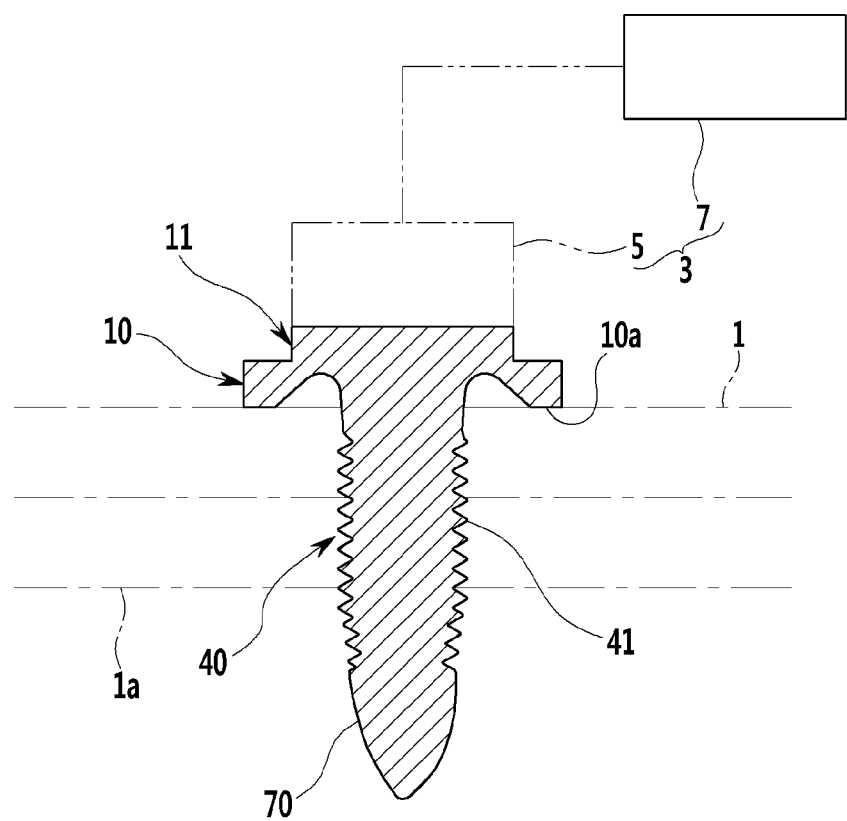
FIG. 1 is a cross-sectional view of a rivet screw drill according to various exemplary embodiments of the present invention.

| <Description of symbols> | |
|---|---|
| 1: panel | 3: fastening tool |
| 5: mounting device | 7: driving device |
| 10: head portion | 10a: rim |
| 11: mounting protrusion | 13: support ends |
| 13a: concave space | 40,40a: fastening portion |
| 41: screw thread | 41a: main screw thread |
| 41b: sub-screw thread | |
| 70, 70a, 70b, 70c: perforating portion | |
| 71: round contact edge | 73: edge groove |
| 74: line contact edge | 75: cutting surface |
| 76: perforating edge groove | 77: first surface |
| 78: second surface | |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, sizes and thicknesses of components shown in the drawings may differ from actual sizes and real thicknesses of the components for better comprehension and ease of description. Therefore, the present invention is not limited to those shown in the drawings.

In the specification, unless explicitly described to the contrary, the word "comprise" and variations such as "comprises" or "comprising" will be understood to imply the inclusion of stated elements but not the exclusion of any other elements.

In the specification, terms such as "portion" and "means" mean a unit of a comprehensive element having at least one function or movement.

FIG. 1 is a cross-sectional view of a rivet screw drill according to various exemplary embodiments of the present invention.

Referring to FIG. 1, a rivet screw drill according to various exemplary embodiments of the present invention may be applied to vehicle assembling processes of which two or more panels 1 and 1a are assembled.

However, the panels 1 and 1a may be vehicle member, frame and so on without being limited to vehicle panels.

Further, the scope of the present invention may be not limited to assemble of the vehicle panels. On the contrary, the scope of the present invention may be applied to assemble elements and structures.

The panels 1 and 1a may be nonmetal elements such as mixed material, plastic, rubber and so on as well as metal elements such as an aluminum sheet, a steel sheet and so on. Also, the panels 1 and 1a may be different kind of materials as well as the same kind of materials.

In various exemplary embodiments of the present invention, the rivet screw drill may mechanically assemble the panels 1 and 1a with friction and plastic deformation.

In the specification, an upper surface or a top surface will be defined as an upward surface in the drawings, and a lower surface or a bottom surface will be defined as a downward surface in the drawings.

The above definition, however, is used for easy comprehension, thus is not limited thereto.

In various exemplary embodiments of the present invention, a fastening tool 3 for a fastening device is used for driving the rivet screw drill.

The rivet screw drill rotates by an operation of the fastening tool 3, forming hole to the panels 1 and 1a, screws the panels 1 and 1a and thus the rivet screw drill may integrally connect the panels 1 and 1a.

The fastening tool 3 may clamp the rivet screw drill, position the rivet screw drill and rotate the rivet screw drill.

The fastening tool 3 may include a mounting device 5 clamping or holding a head portion 10 of the rivet screw drill and a driving device 7 pushing and rotating the mounting device 5.

The fastening tool 3 may be a tool applied to a friction stir processing known to a person skilled in the art, thus detailed description will be omitted.

Figure 2:
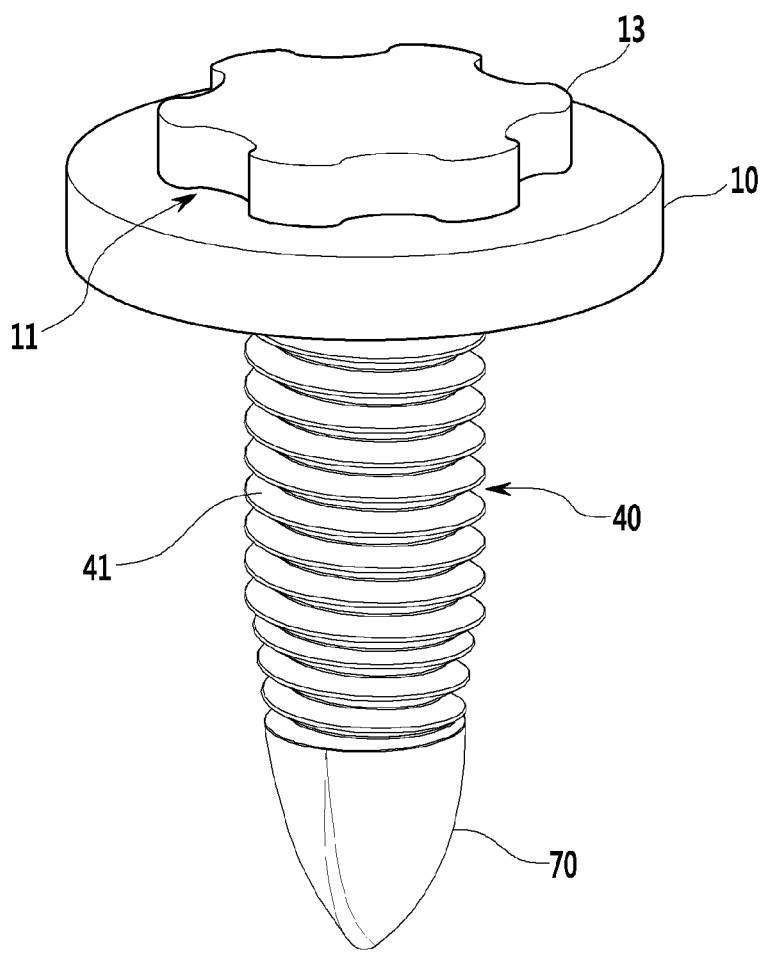
FIG. 2 is a perspective view of a rivet screw drill according to various exemplary embodiments of the present invention.
Figure 3:
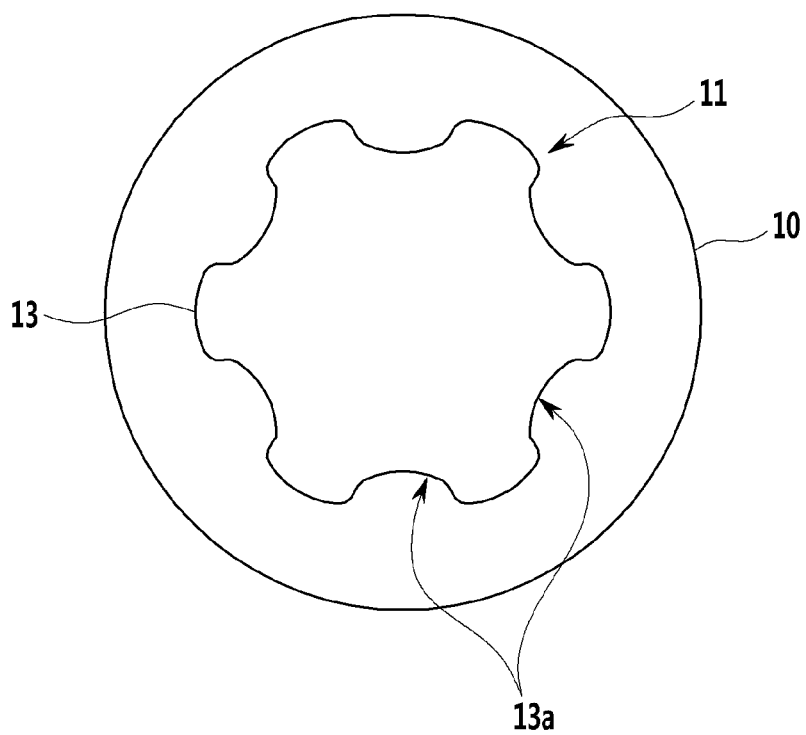
FIG. 3 is a plane view of a rivet screw drill according to various exemplary embodiments of the present invention.

FIG. 2 is a perspective view of a rivet screw drill according to various exemplary embodiments of the present invention and FIG. 3 is a plane view of a rivet screw drill according to various exemplary embodiments of the present invention.

Referring to FIG. 1 to FIG. 3, the rivet screw drill according to various exemplary embodiments of the present invention includes the head portion 10, a fastening portion 40 and a perforating portion 70.

The head portion 10, as described above, is mounted or clamped to the fastening tool 3 and may be a disk shape with a predetermined thickness.

Also, the head portion 10 supports a top portion of the panels 1 and 1a after assembling the panels 1 and 1a.

A rim 10a is protruded from the head portion 10 and elastic force of the rim 10a pressurizes the panel 1. Thus rivet screw drill may stably fasten the panels 1 and 1a.

For the head portion 10 to be mounted or clamped to the fastening tool 3, a mounting protrusion 11 mounted to the fastening tool 3 is formed to an upper portion of the head portion 10.

The mounting protrusion 11 is mounted to the mounting device 5 of the fastening tool 3. That is, the mounting protrusion 11 is inserted into and clamped to a mounting hole formed to the mounting device 5.

The mounting protrusion 11 is formed to the upper and a center portion of the head portion 10. A plurality of support ends 13 are formed to the mounting protrusion 11.

In various exemplary embodiments of the present invention, the support ends 13 are formed to the mounting protrusion 11 as a pair and radially disposed. For example, as shown in the drawing, six support ends 13 are formed as a sunflower shape.

A concave space 13a may be formed between the support ends 13. The rivet screw drill may be stably mounted to mounting device 5 of the fastening tool 3 due to the support ends 13 and the concave space 13a.

Figure 4:
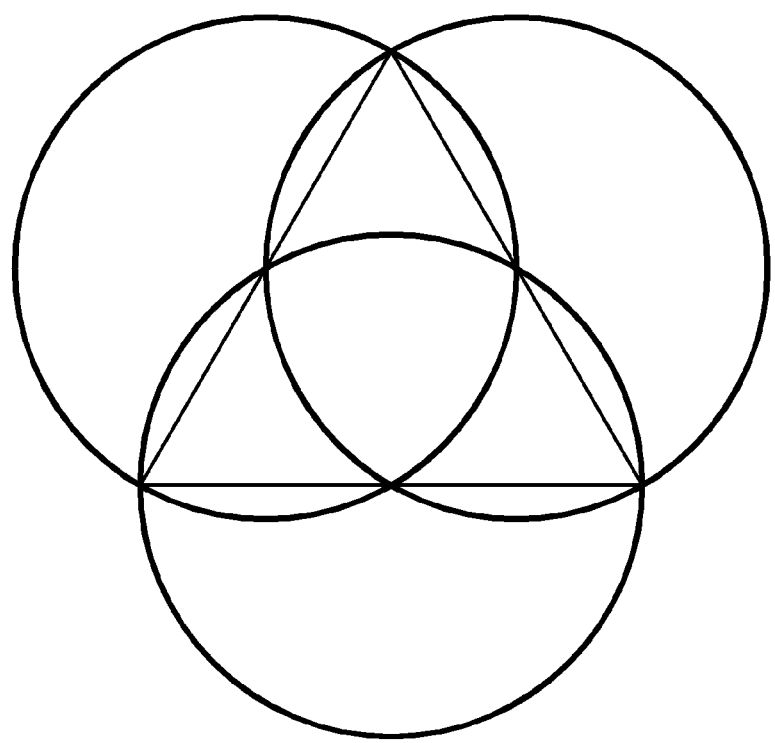
FIG. 4 is a drawing explaining a head portion of a rivet screw drill according to various exemplary embodiments of the present invention.
Figure 5:
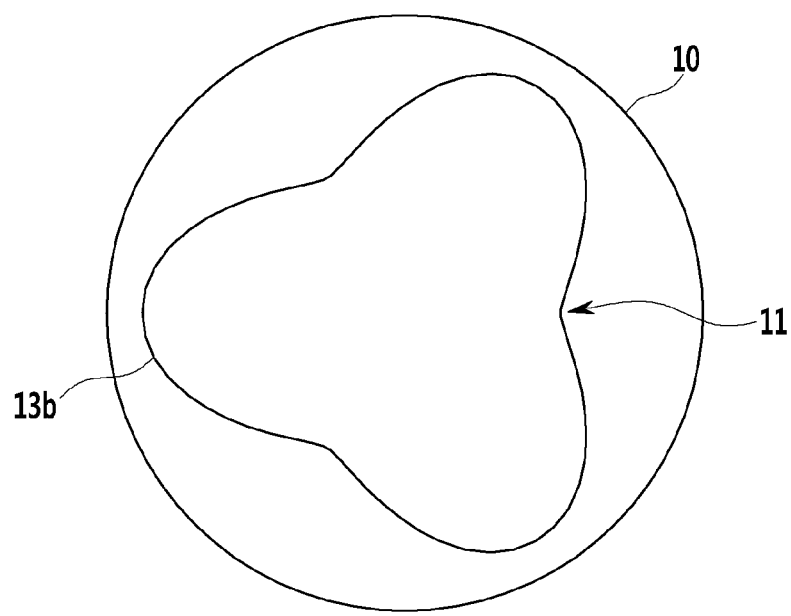
FIG. 5 is a top plan view of a head portion of a rivet screw drill according to various exemplary embodiments of the present invention.

FIG. 4 is a drawing explaining a head portion of a rivet screw drill according to various exemplary embodiments of the present invention and FIG. 5 is a top plan view of a head portion of a rivet screw drill according to various exemplary embodiments of the present invention.

Referring to FIG. 4 and FIG. 5, as an exemplary variation embodiment, support ends 13b are formed radially to the mounting protrusion 11.

The support ends 13b may be shaped as a triangular circle or three inter-penetrating circles in a triangular layout.

The triangular circle or three inter-penetrating circles in a triangular layout, as shown in as shown in FIG. 4, are similar to a shape formed by overlapping three circles.

As variation embodiments, support ends may be shaped as a square circle or four inter-penetrating circles in a square layout.

The sunflower shape or the triangular circle shape of the mounting protrusion 11 may increase contacting area of the mounting protrusion 11 thus mounting or clamping stability may be enhanced.

Referring to FIG. 1 to FIG. 3, in various exemplary embodiments of the present invention, the fastening portion 40 is screwed inner sides of holes of the panels 1 and 1a formed by the perforating portion 70 and integrally connects the panels 1 and 1a.

The fastening portion 40 is integrally formed to a lower portion of the head portion 10 and of which a screw thread 41 is formed thereto.

The perforating portion 70 integrally formed to a lower portion of the fastening portion 40, pressurizes and penetrates to form hole to the panels 1 and 1a by rotation according to operation of the fastening tool 3.

The perforating portion 70 is integrally formed with the fastening portion 40 and become sharp toward an end thereof for piercing the panels 1 and 1a with friction and torque.

That is, a cross section of the perforating portion 70 is become smaller from the fastening portion 40 to the end thereof. And the perforating portion 70 forms holes to the panels 1 and 1a with pressure and torque applied by the fastening tool 3.

Figure 6:
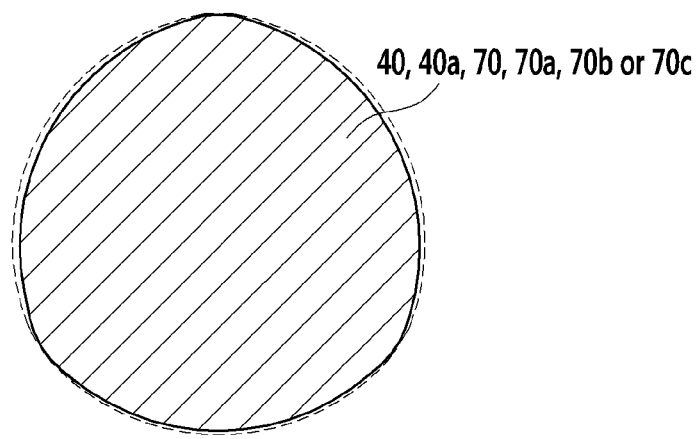
FIG. 6 is a cross sectional view of a rivet screw drill according to various exemplary embodiments of the present invention.

In various exemplary embodiments of the present invention, the fastening portion 40 and the perforating portion 70 have a cross section shaped as a Reuleaux triangle (close to circular triangle) as shown in FIG. 6.

The Reuleaux triangle is a shape formed from the intersection of three circular disks, each having its center on the boundary of the other two.

The screw thread 41 of the fastening portion 40 is formed to a circumference of the fastening portion 40 shaped as a Reuleaux triangle.

Hereinafter, assembling using the rivet screw drill according to various exemplary embodiments of the present invention will be described referring to drawings.

The head portion 10 of the rivet screw drill is mounted to the mounting device 5 of the fastening tool 3. In this case, the head portion 10 is mounted to the mounting device 5 by inserting the mounting protrusion 11 into the mounting hole of mounting device 5.

The mounting protrusion 11 shaped as the sunflower shape or the triangular circle shape may increase contacting area of the mounting protrusion 11 thus mounting or clamping stability may be enhanced.

The driving device 7 of the fastening tool 3 positions the rivet screw drill on the overlapped panels 1 and 1a for the perforating portion 70 to be contacted with the panels 1 and 1a and rotates the rivet screw drill.

Then pressure and torque of the perforating portion 70 against the panels 1 and 1a deforms the panels 1 and 1a plastically to be pierced. The hole formed by the perforating portion 70 may have a diameter smaller than a diameter of the screw thread 41 of the fastening portion 40.

The perforating portion 70 has the cross section shaped as a Reuleaux triangle (close to circular triangle).

Thus, frictional heat due to the perforating portion 70 for piercing may be increased so that plastic deformation of the panels 1 and a1 may be performed easily and stably.

After the perforating portion 70 forms the holes to the panels 1 and 1a, the rivet screw drill continues rotation.

Thus, the fastening portion 40 of the rivet screw drill perforating portion 70 penetrates into the hole formed to the panels 1 and 1a and the screw thread 41 is screwed with the interior of the holes. Then, the head portion 10 supports the upper portion of the panels 1 and 1a.

Because the cross section of the perforating portion 70 is shaped as a Reuleaux triangle, the screw thread 41 formed to corners of the cross section of the perforating portion 70 is stably and strongly screwed with the hole and thus the panels 1 and 1a are integrally connected.

Also, due to the cross section of the perforating portion 70 shaped as a Reuleaux triangle, required load or torque of the fastening tool 3 may be lessened and thus operation stability of the fastening tool 3 may be improved.

As described above, the rivet screw drill according to various exemplary embodiments of the present invention may enhance productivity because previous processes of piercing holes are not required and may enhance piercing characteristic and joining strength thereof.

Figure 7:
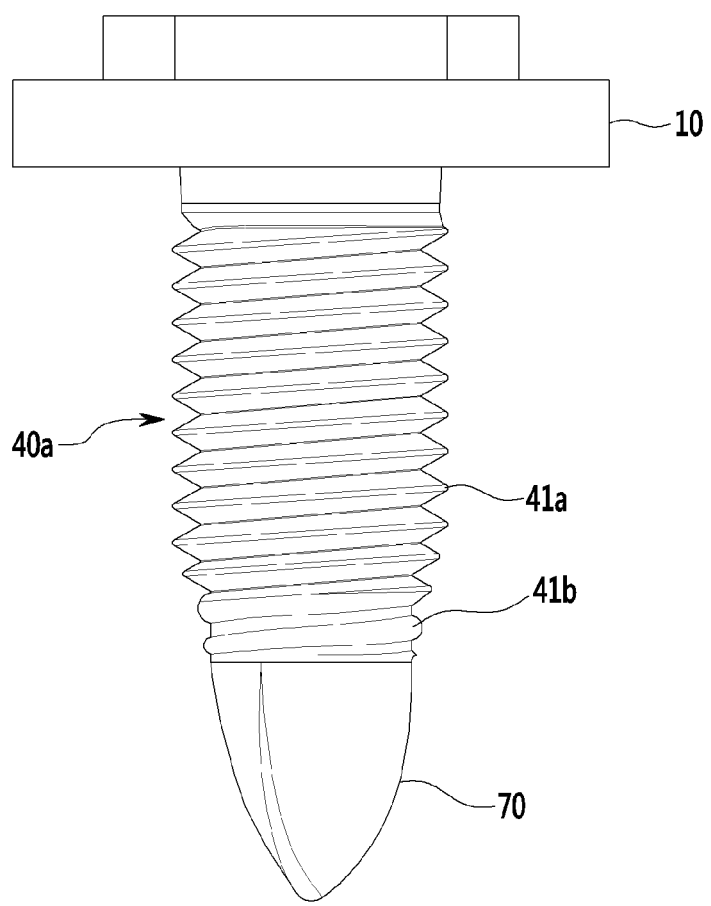
FIG. 7 is a front view of a rivet screw drill according to various exemplary embodiments of the present invention.

FIG. 7 is a front view of a rivet screw drill according to various exemplary embodiments of the present invention.

During description of a rivet screw drill shown in FIG. 7, the same constituent elements described in FIG. 1 to FIG. 6 will be omitted for easy comprehension.

The rivet screw drill according to various exemplary embodiments of the present invention includes a fastening portion 40a and the fastening portion 40a includes a main screw thread 41a and a sub-screw thread 41b.

The main screw thread 41a is screwed with the hole formed to the panels 1 and 1a and formed from the head portion 10 to a part of the fastening portion 70.

The sub-screw thread 41b is formed from the main screw thread 41a to the other portion of the perforating portion 70 for supporting the hole before the main screw thread 41a is screwed with the hole.

Size of the sub-screw thread 41b may be smaller than size of the main screw thread 41a.

For example, the main screw thread 41a may be shaped as a triangle and the sub-screw thread 41b may be round shaped.

When the fastening tool 3 pushes and rotates the rivet screw drill, the perforating portion 70 forms the holes to panels 1 and 1a.

Then, the sub-screw thread 41b of the fastening portion 40a supports the panels 1 and 1a within the holes. After that, the main screw thread 41a penetrates into the holes of the panels 1 and 1a and is screwed with the panels 1 and 1a.

Since the sub-screw thread 41b of the fastening portion 40a supports the panels 1 and 1a within the holes before the main screw thread 41a is screwed with the hole, the rivet screw drill may stably connects the panels 1 and 1a.

Also, the sub-screw thread 41b of the fastening portion 40a may prevent the rivet screw drill from being separated from the hole.

Since the sub-screw thread 41b of the fastening portion 40a may prevent the rivet screw drill from being separated from the hole, productivity and connecting characteristic may be enhanced.

Other elements of the rivet screw drill are the same described above, thus repeated explanation will be omitted.

Figure 8:
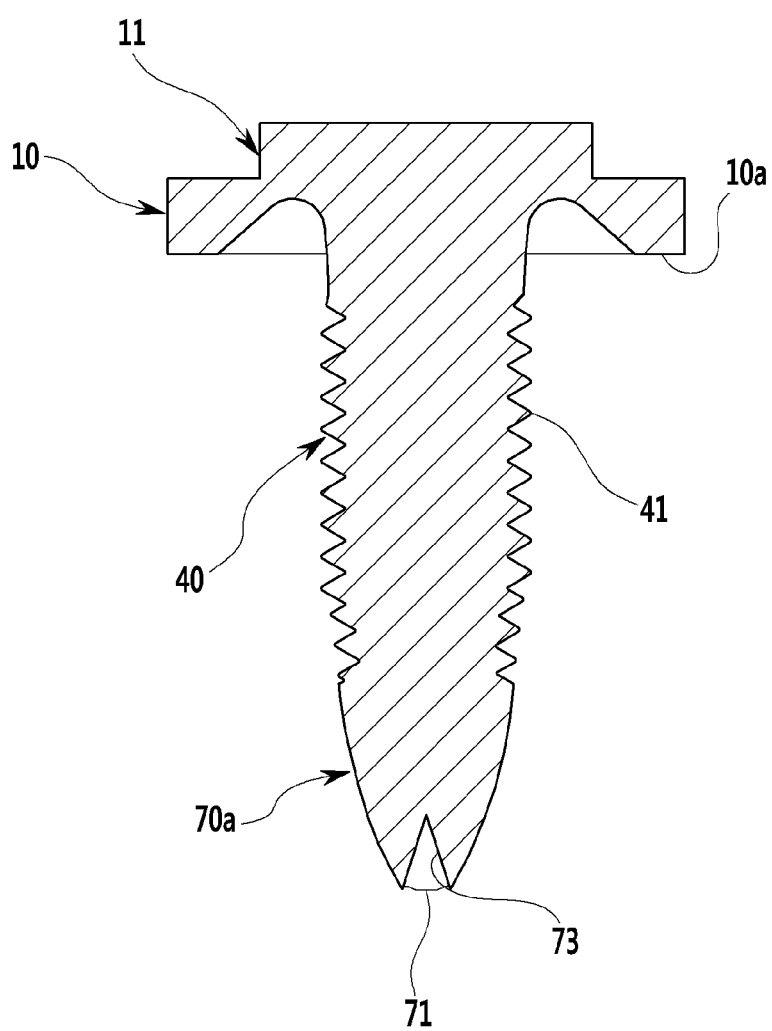
FIG. 8 is a cross sectional view of a rivet screw drill according to various exemplary embodiments of the present invention.
Figure 9:
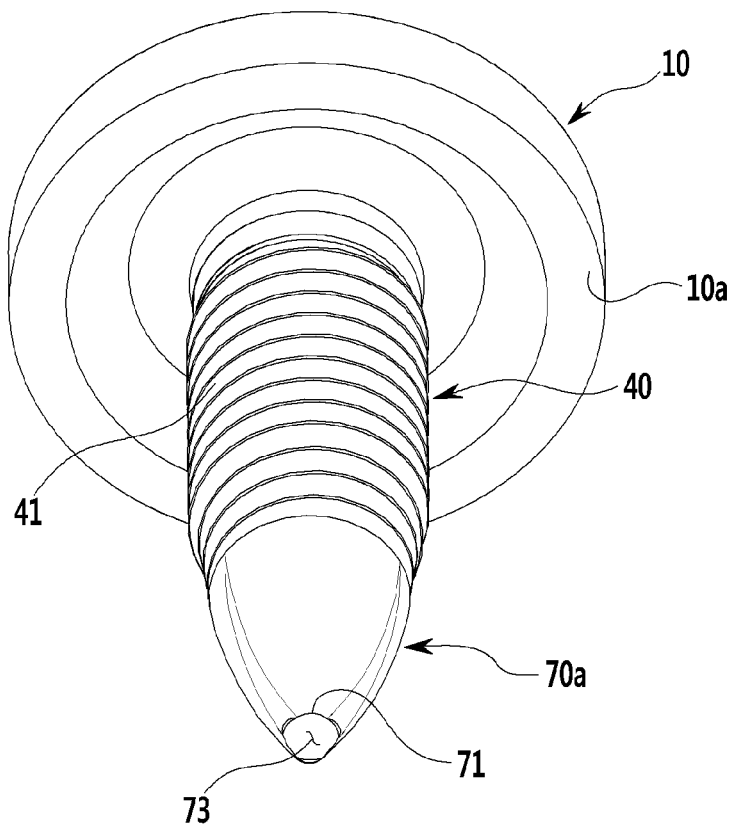
FIG. 9 is a perspective view of a rivet screw drill according to various exemplary embodiments of the present invention.
Figure 10:
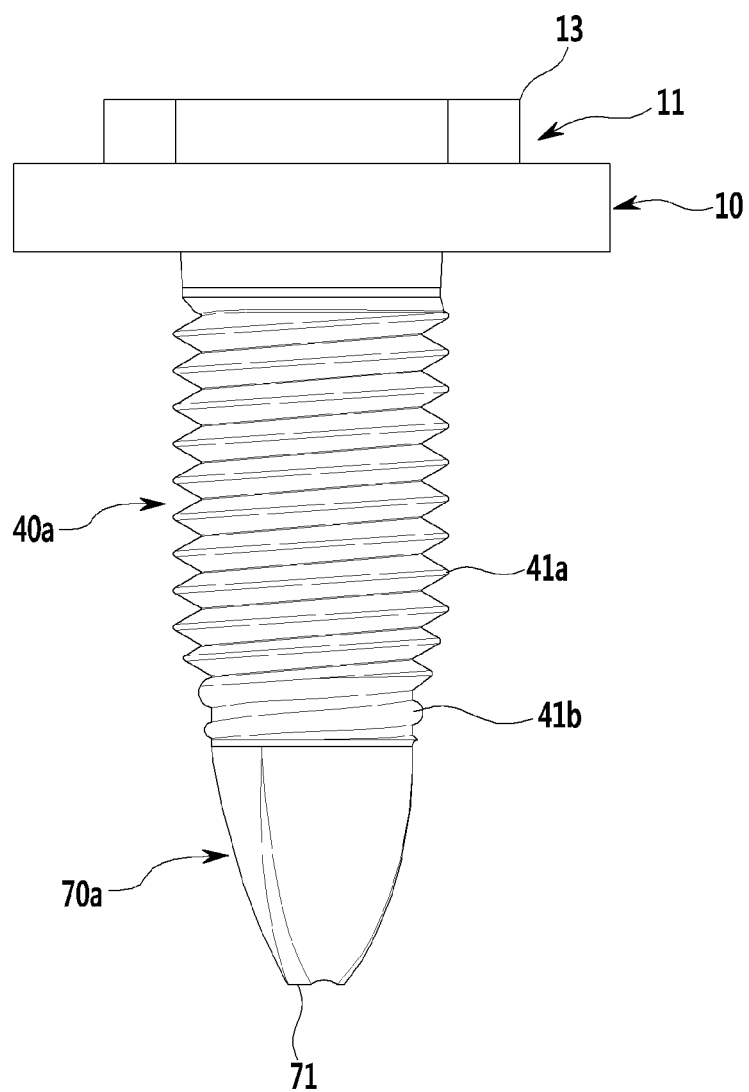
FIG. 10 is a front view of a rivet screw drill according to various exemplary embodiments of the present invention.

FIG. 8 is a cross sectional view of a rivet screw drill according to various exemplary embodiments of the present invention, FIG. 9 is a perspective view of a rivet screw drill according to various exemplary embodiments of the present invention and FIG. 10 is a front view of a rivet screw drill according to various exemplary embodiments of the present invention.

During description of a rivet screw drill shown in FIG. 8 to FIG. 10, the same constituent elements described in FIG. 1 to FIG. 7 will be omitted for easy comprehension.

The rivet screw drill according to various exemplary embodiments of the present invention includes a perforating portion 70a.

A round contact edge 71 is formed to an end of the perforating portion 70a contacting the panel 1. The round contact edge 71 may be formed as a circular arc to the end of the perforating portion 70a.

The round contact edge 71 of the perforating portion 70a contacting the upper surface of the panel 1 and derived by fastening tool 3 applies pressure and torque to the panels 1 to be pierced.

Line contact between the round contact edge 71 and the upper surface of the panels 1 may increase friction power and friction heat and improve piercing characteristic against the panels 1.

The round contact edge 71 may be formed by forming an edge groove 73 to the end of the perforating portion 70a. The edge groove 73 is opened to the downward.

The edge groove 73 may be formed as a conical hat or a cone.

Between the perforating portion 70a and the head portion 10, as shown in FIG. 8 and FIG. 9, the fastening portion 40 is formed, and the screw thread 41 as describe above is formed to the fastening portion 40.

Also, between the perforating portion 70a and the head portion 10, as shown in FIG. 10, the fastening portion 40a is formed, and the main screw thread 41a and the sub-screw thread 41b are formed to the fastening portion 40a.

Since the main screw thread 41a and the sub-screw thread 41b are described above, repeated description will be omitted.

Figure 11:
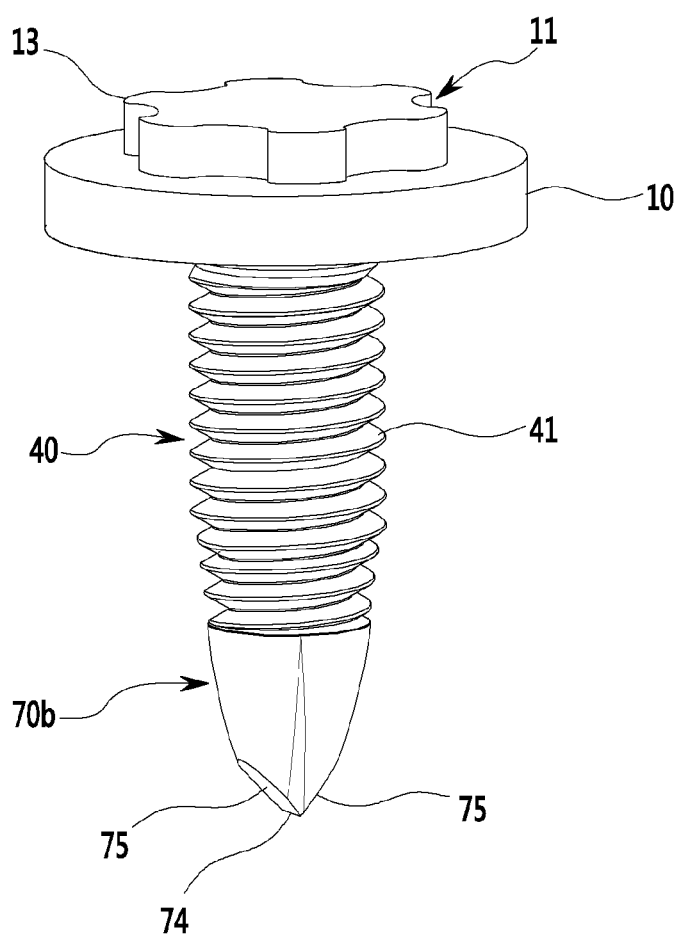
FIG. 11 and FIG. 12 are perspective views of a rivet screw drill according to various exemplary embodiments of the present invention.
Figure 12:
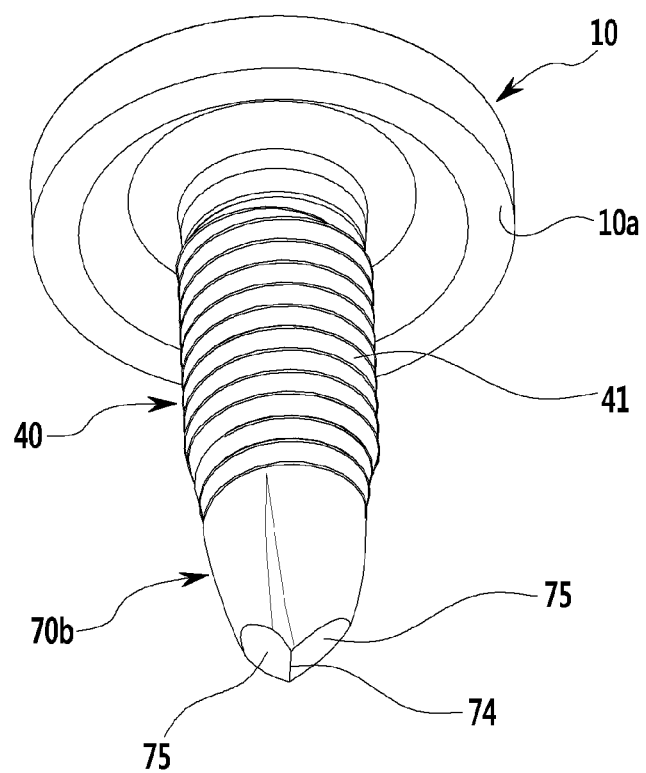

FIG. 11 and FIG. 12 are perspective views of a rivet screw drill according to various exemplary embodiments of the present invention.

During description of a rivet screw drill shown in FIG. 11 to FIG. 12, the same constituent elements described in FIG. 1 to FIG. 10 will be omitted for easy comprehension.

The rivet screw drill according to various exemplary embodiments of the present invention includes a perforating portion 70b.

A line contact edge 74 is formed to an end of the perforating portion 70b. The line contact edge 74 may be formed as straight line and line contacts with an upper surface of the panel 1.

The line contact edge 74 of the perforating portion 70b contacting the upper surface of the panel 1 and derived by fastening tool 3 applies pressure and torque to the panels 1 to be pierced.

Line contact between the line contact edge 74 and the upper surface of the panels 1 may increase friction power and friction heat and improve piercing characteristic against the panels 1.

The line contact edge 74 may be formed by forming a cutting surface 75 to the end of the perforating portion 70b. The cutting surface 75 may be formed as a pair for forming "V" shape to form the line contact edge 74.

Figure 13:
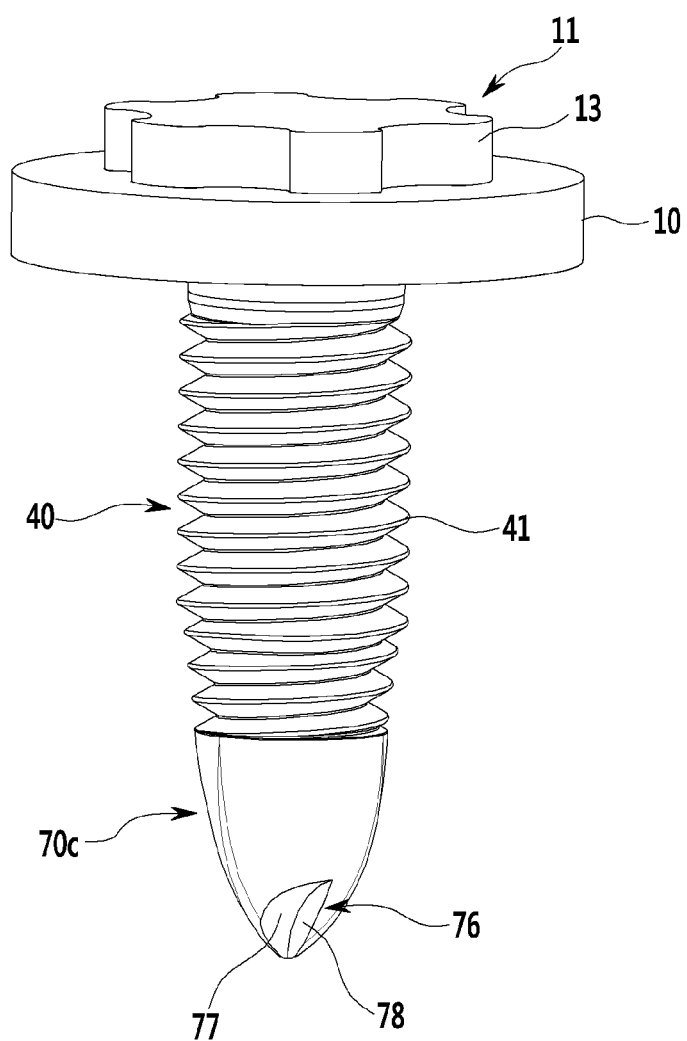
FIG. 13 and FIG. 14 are perspective views of a rivet screw drill according to various exemplary embodiments of the present invention.
Figure 14:
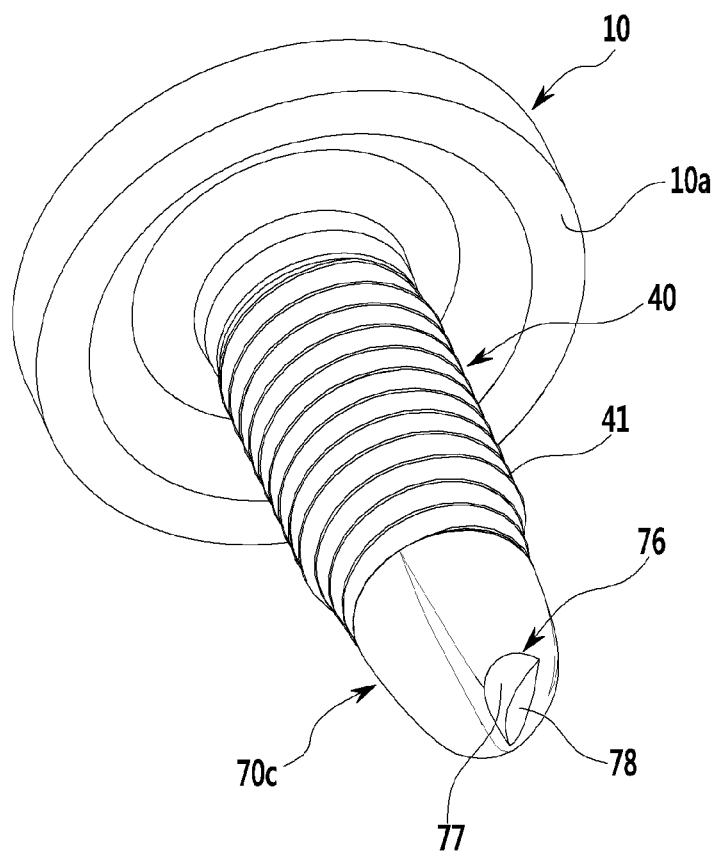

FIG. 13 and FIG. 14 are perspective views of a rivet screw drill according to various exemplary embodiments of the present invention.

During description of a rivet screw drill shown in FIG. 13 to FIG. 14, the same constituent elements described in FIG. 1 to FIG. 12 will be omitted for easy comprehension.

The rivet screw drill according to various exemplary embodiments of the present invention includes a perforating portion 70c and a perforating edge groove 76 is formed to the perforating portion 70c.

The perforating edge groove 76 of the perforating portion 70c contacting the upper surface of the panel 1 and derived by fastening tool 3 applies pressure and torque to the panels 1 to be pierced.

The perforating edge groove 76 is formed to a sharp end of the perforating portion 70c. The perforating edge groove 76 includes a first surface 77 and a second surface 78 that are formed from the end of the perforating portion 70c.

The first surface 77 is a curved surface formed from the end of the perforating portion 70c toward the fastening portion 40. The second surface 78 is a flat surface formed for connecting the first surface 77 with an outer surface of the perforating portion 70c.

Since the perforating edge groove 76 is formed to the end of the perforating portion 70c, the end of perforating portion 70c may be further sharp. That is, edge of the perforating edge groove 76 may function as a sharp knife to pierce the panels 1.

The perforating edge groove 76 formed to the end of perforating portion 70c may easily form a hole to the panels 1 and improve piercing characteristic against the panels 1.

In the drawing, one perforating edge groove 76 is formed to the perforating portion 70c. However, it is not limited thereto; on the contrary, the perforating portion 70c may be formed as a pair and so on.

Figure 15:
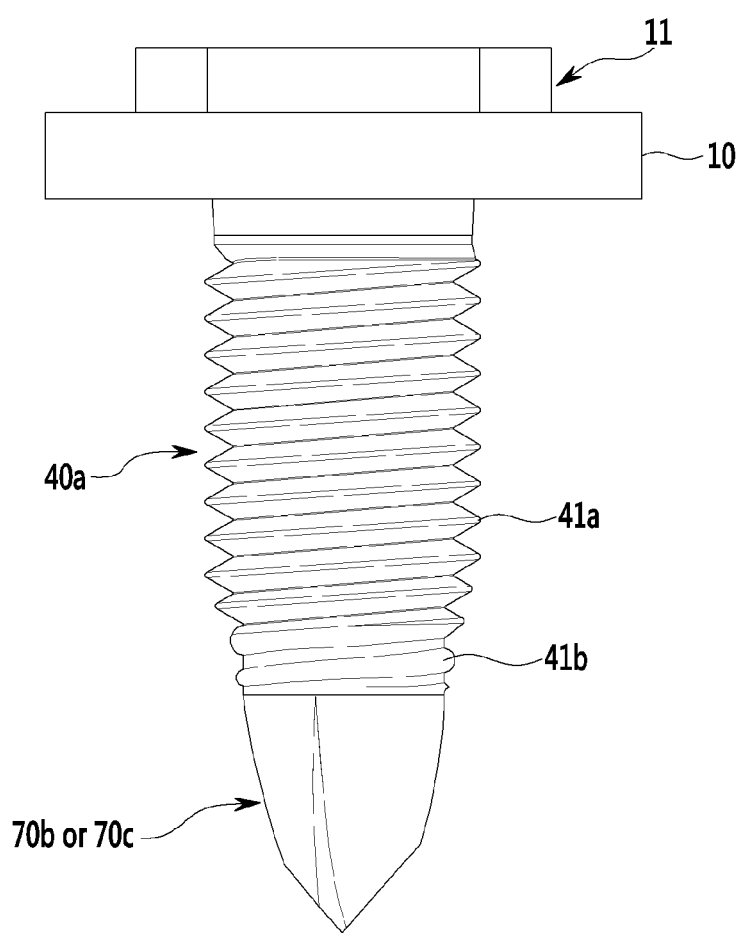
FIG. 15 is a front view of a rivet screw drill according to various exemplary embodiments of the present invention.

FIG. 15 is a front view of a rivet screw drill according to various exemplary embodiments of the present invention.

The rivet screw drill shown in FIG. 11 to FIG. 14 may include the fastening portion 40, where the screw thread 41 is formed, formed between the head portion 10 and the perforating portion 70b or 70c.

Since structure and function of the screw thread 41 are described above, repeated description will be omitted.

Referring to FIG. 15, the rivet screw drill shown in FIG. 11 to FIG. 14 may include the fastening portion 40a and the main screw thread 41a and the sub-screw thread 41b are formed thereto.

Since structure and function of the main screw thread 41a and sub-screw thread 41b are described above, repeated description will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rivet screw drill for fastening at least two panels, the rivet screw drill comprising:
   a head portion mounted to a fastening tool;
   a fastening portion integrally formed with the head portion and of which a screw thread is formed thereto; and
   a perforating portion integrally formed with the fastening portion and pressurizing and penetrating the panels by rotation according to operation of the fastening tool, wherein
   a mounting protrusion, connected to the fastening tool, is protruded from the head portion and a plurality of support ends are formed to the mounting protrusion, and a concave space is formed between the support ends,
   the perforating portion becomes sharp toward an end thereof,
   the fastening portion and the perforating portion have a cross section shaped as Reuleaux triangle, and
   the perforating portion has a perforating edge groove which comprises a first surface and a second surface that are formed from the end of the perforating portion,
   the first surface being a curved surface formed from the end of the perforating portion toward the fastening portion and the second surface being a flat surface connecting the first surface with an outer surface of the perforating portion.

2. The rivet screw drill of claim 1, wherein the support ends are formed as a pair and radially disposed.

3. The rivet screw drill of claim 2, wherein six support ends are formed as a sunflower shape.

4. The rivet screw drill of claim 1, wherein three support ends are formed and radially disposed.

5. The rivet screw drill of claim 4, wherein the support ends are shaped as a triangular circle.

6. The rivet screw drill of claim 1, wherein the fastening portion comprises:
   a main screw thread shaped as a triangle formed from the head portion to a part of the fastening portion; and
   a sub-screw thread round shaped from the main screw thread to the other portion of the perforating portion.

7. The rivet screw drill of claim 1, wherein:
   the perforating portion becomes sharp toward an end thereof; and
   a round contact edge contacting the panel is formed to the end of the perforating portion.

8. The rivet screw drill of claim 7, wherein an edge groove is formed to an end of the perforating portion.

9. The rivet screw drill of claim 8, wherein the edge groove is formed as a cone.

10. The rivet screw drill of claim 7, wherein the fastening portion comprises:
    a main screw thread shaped as a triangle formed from the head portion to a part of the fastening portion; and
    a sub-screw thread round shaped from the main screw thread to the other portion of the perforating portion.

11. The rivet screw drill of claim 7, wherein:
    the fastening portion and perforating portion have a cross section shaped as a Reuleaux triangle.

12. The rivet screw drill of claim 1, wherein:
    the perforating portion becomes sharp toward an end thereof; and
    a line contact edge is formed to the end of the perforating portion contacting the panel.

13. The rivet screw drill of claim 12, wherein a cutting surface is formed to the perforating portion.

14. The rivet screw drill of claim 1, wherein the fastening portion comprises:
    a main screw thread shaped as a triangle formed from the head portion to a part of the fastening portion; and
    a sub-screw thread round shaped from the main screw thread to the other portion of the perforating portion.

15. The rivet screw drill of claim 1, wherein:
    the fastening portion and perforating portion have a cross section shaped as a Reuleaux triangle.

16. The rivet screw drill of claim 1, wherein:
    a rim is protruded from the head portion.

* * * * *